Nov. 12, 1957    H. STRAUB    2,812,657
CONTACT ELONGATION METER
Filed Jan. 19, 1954
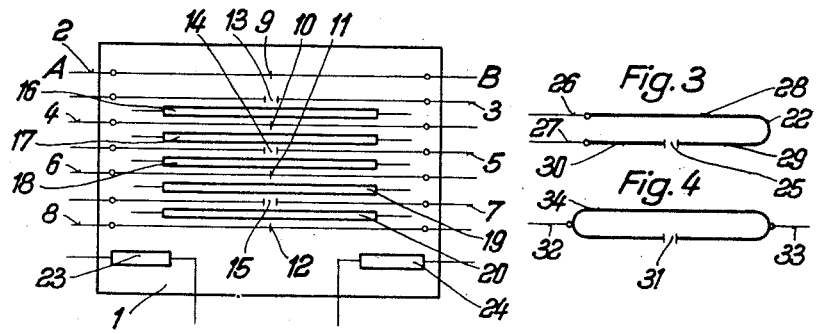
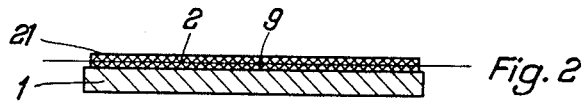
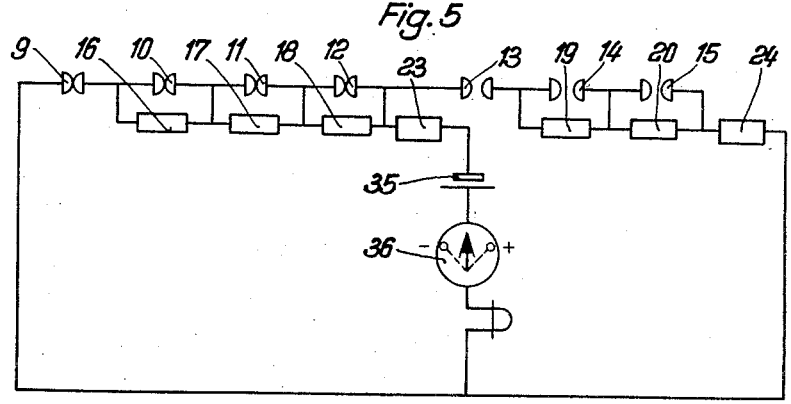
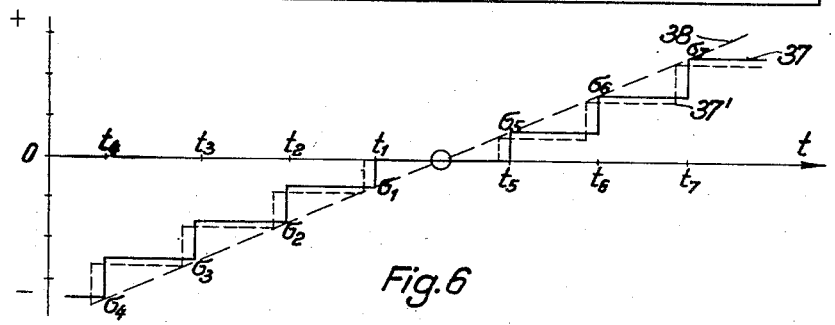
Inventor:
HERMAN STRAUB,
BY Parry and Fiere
ATTORNEYS United States Patent Office 2,812,657
Patented Nov. 12, 1957

2,812,657

CONTACT ELONGATION METER

Hermann Straub, Friedrichshafen am Boden See, Germany, assignor to Zahnradfabrik Friedrichshafen, Friedrichshafen am Boden See, Germany Application January 19, 1954, Serial No. 405,002

Claims priority, application Germany January 22, 1953

10 Claims. (Cl. 73—88.5)

This invention relates to contact strain gauges.

Electrical strain measuring methods are used in order to ascertain the distribution of stress and the variation under dynamic loads of test bars and in machine parts. For this purpose electrical, insulated resistance wires are so combined with the article to be tested that they are deformed together with the article and thereby their resistance (or their capacitance in the case of the use of condensers) is varied proportionally to the deformation of the article.

Arrangement of electric contacts upon the article to be tested which are opened or closed by the deformation of the article, in order to ascertain static variations of load are also known.

The first-mentioned resistance (or capacitance) strain gauges are in fact adapted to record dynamic loading occurrences, but have the disadvantage that they require complacated amplifier arrangements, whereby their use for operational measurements is greatly limited. In measurement on moving parts there is the further disadvantage that in taking current from the moved article to be tested, variable transfer resistances occur, which falsify the test current which in itself is weak.

In contrast thereto the contact strain gauge has the advantage that it does not require an amplifier arrangement. The constructions known hitherto, however, require a relatively large space, so that it is not possible to arrange a large number thereof on one point of measurement, which is sometimes necessary.

The present invention aims at obviating these difficulties by providing a contact strain gauge having very small space requirements, and which combines the above-mentioned advantages of the contact strain gauge with those of the resistance strain gauge. To this end, the present invention consists in contact strain gauges for ascertaining local stresses and variations of forces in test specimens and machine parts, with static and dynamic load, wherein wires, conductive layers, or the like are used in the elastic region as electrical contactors, having one or more points of disconnection and being secured to the article to be tested, in such a way that the points of disconnection open or close under variation of load of the article to be tested.

As electrical contactors, there may be used, for example, one or more wires embedded in varnished foils, which wires are interrupted at one point. The wires with their points of disconnection take up little space, and therefore a large number of them can be arranged at a single measuring point. With various calibrations of the individual points of disconnection it is possible to record a variable stress curve, even if only in stages. For example with a loop oscillograph, this taking place in accordance with the invention due to the fact that a plurality of contact strain gauges lying close to one another are combined in one measuring current circuit, for example in series connection, measuring resistances being used. For the sake of simplicity of production, the measuring resistances may be embedded in the same varnished foil as the contact wires.

The same effect is also obtained by the use of a conductive pulverous layer applied on an insulating layer, for example a varnish layer, upon which pulverous layer a further metallic layer can then be applied galvanically. In order to protect the point of disconnection thus standardised from further variations, the said point is enclosed in accordance with a further feature of the invention in air-tight fashion, for example by sticking with paper, insulating tape, or the like. The closing can also be effected in an atmosphere of protective gas, for example in nitrogen, in order to preclude all possibility of corrosion by enclosed air. The corrosion protection in the case of standardisation by galvanic deposition can be achieved by the use of a corrosion-proof deposited metal, for example silver.

The standardisation of a thin metal layer, galvanically deposited on a conductive pulverous layer is rendered possible in accordance with a feature of the invention by the fact that the brittleness of the conductive layer is determined by variation of the galvanic process. On the first loading of the finished contact layer, at certain load stages, cracks then appear at certain intervals, and thus a number of points of disconnection. The sections of the conductive layer thus formed are connected in one measuring current circuit according to the described arrangement of a plurality of contact wires. In operation the individual points of disconnection then open on the occurrence of the corresponding load stages determined in the standardisation.

The conductive layer can also be applied to a pre-stressed article for testing. It is then possible to measure compressive stresses.

In order to preclude errors of measurment resulting from heat expansion of the article to be tested and the contactor, in accordance with a still further feature of the invention a contact material is selected, the linear cofficient of expansion of which is somewhat greater than, or at least equal to, that of the material of the article to be tested. By virtue of this, on variation of temperature, the article to be tested and the contactor expand or contract uniformly, and the width of the gap at the point of disconnection remains within the limits necessary for obtaining sufficient accuracy of measurement.

According to a further feature of the invention, compensation for changes of shape due to variation of temperature may be obtained by making the contact wires of hairpin or the like form. By virtue of this construction the width of the contact point is again made independent of temperature variations.

The contact wires may also be made with two branches, one of which is interrupted and serves as a contact, while the other branch is used as a series resistance.

In order that the invention may be more readily understood, reference is made to the accompanying drawings, which illustrate diagrammatically and by way of example several embodiments thereof, and in which:

Figure 1 shows an article to be tested in plan view, with contacts, resistances and connecting wires arranged thereon;

Figure 2 is a longitudinal section on the line A—B of Figure 1;

Figure 3 shows a contact wire with heat compensation;

Figure 4 shows a contact wire with series resistance;

Figure 5 is a circuit diagram of a measuring arrangement with loop oscillograph; and Figure 6 is a time-stress curve.

In Figure 1, 1 is a test bar, which is subjected in the example illustrated to an alternating bending stress. 2 to 8 are contact wires with their supply leads, the contact wires are secured on the surface of the test bar and insulated therefrom, 2, 4, 6 and 8 being wires with contact points 9, 10, 11, 12 closed in the unstressed state. The wires 3, 5, 7 on the other hand are wires with contact points 13, 14, 15 open in the unstressed state. The former respond to tensional stresses, the latter to compressive stresses. The drawing is not according to scale. In practice the contact wires could lie substantially closer together, in order that the stresses at a point of measurement defined as closely as possible may be ascertained.

Series resistances 16, 17, 18, 19, 20 are arranged between the contact wires. Furthermore in the vicinity of the measuring point there are two thermal compensation resistances 23 and 24. The series resistances can also be made as conductive layers, and be arranged above or below the contact wires.

Figure 2 shows a longitudinal section along the line A—B (Figure 1) of the article 1 to be tested, which is subjected to an alternating bending stress. 2 is the contact wire with the closed contact point 9, which is embedded in a varnished layer 21.

Figure 3 shows a contact wire 22 of hairpin shape with a point of disconnection 25 and two supply wires 26 and 27. Heating of one leg 28 during operation is compensated for by the equally large total expansion of the two parts 29 and 30 of the other leg. The width of the point of disconnection thus remains of equal magnitude at every operating temperature of the contact wire.

Figure 4 shows a similar form of a contact wire with a point of disconnection 31 and two feed wires 32 and 33. The width of the gap 31 is here again of the same magnitude at every temperature. The branch 34 of the contact wire can be calibrated and used as shunt resistance.

Figure 5 is a circuit diagram for the measuring point illustrated in Figures 1 and 2, the same parts being designated with the same reference numbers in both Figures. 9, 10, 11 and 12 are the contacts responding to tensional stresses, and 13, 14, 15 are the contacts responding to compressive stresses. Both groups are connected in series with a current source 35 and loop oscillograph 36, which is illustrated in the zero position. This corresponds to the unstressed state of the part 1 to be tested (Figure 1). The resistances 16, 17 and 18 are in parallel with the contacts 10, 11, 12, and the resistances 19 and 20 are in parallel with the contacts 14, 15. Furthermore there is a thermal compensation resistance 23 and 24 in each of the two measuring circuits.

Figure 6 shows a stepped time-stress curve 37 recorded with the measuring arrangement described above. The individual threshold values of the stress measured are entered in each case beneath the associated contact which responds to the stress value in question. Compressive stresses (+) are entered above the horizontal time axis $t$ and tensional stresses (−) are entered below this axis. The individual threshold values are connected by a curve path 38 in chain lines, which in fact reproduces the actual stress course point-by-point. The closer the contacts can be arranged, the closer the observed stress point. The slight space needs of contactors according to the invention therefore renders possible a very precise point-by-point recording of dynamic stresses.

The manner of operation of the measuring arrangement is as follows: On the illustrated unstressed state of the contact wires 2 to 8, the oscillograph loop 36 is in its zero position. This corresponds to the 0 point of the time-stress curve 37.

In the current circuit of the contacts 9, 10, 11, 12 a current flows through the oscillograph, the magnitude of which is determined by the resistance of the instrument and the compensation resistance 23, and which is so large that the instrument indicates zero.

As soon as an alternating bending stress is impressed upon the article 1 to be tested, the measuring point on the article to be tested experiences, after the elapse of a certain time $t$ a change of shape, for example a stretching, which is caused by the tensional stress $\sigma$ (−) shown on Fig. 6.

After a time $t_1$ this tensional stress has reached the first threshold value $\sigma_1$, which corresponds to the standardised stress of the contact 12. The contact 12 then opens, and a measuring current flows through the contacts 9, 10 and 11, and the resistances 18 and 23, which current is lower than the zero current. The measuring instrument therefore deflects to the left. After the time $t_2$ has elapsed, the next threshold value $\sigma_2$ is reached. The contact 11 opens, the measuring current is further reduced by the addition of the resistance 17. The deflection of the oscillograph 36 is enlarged further until finally a stress $\sigma_4$ is reached which corresponds to the standardised value of the contact 9. The latter opens, and thus opens the measuring circuit for the tensional stresses, and the instrument passes into its (−)-end position.

Conversely the indication then takes place when the stress returns to zero and assumes positive (compression) values. After passing through the stress values $\sigma_5$ and $\sigma_6$ the maximum compressive stress $\sigma_7$ is finally reached after the elapse of the time $t_7$, which stress corresponds to the standardised value of the contact 15. The latter closes and thus all the contacts 13, 14 and 15 are closed. The measuring current flows only through the resistance 24 and indicating apparatus 36, which passes into the (+)=end position.

The measuring operation then takes place in the manner described above when the article 1 to be tested is at normal temperature. This is the temperature at which the contacts were standardised. If the measuring temperature varies from the standard temperature, for example if it is higher than the latter by a certain amount, and if the coefficient of expansion of the contact wires is greater than that of the material of the article to be tested, the contacts do not respond at their standardised values, but at stress values which are too high by a constant amount for the tension side, and too low by the same amount for the compression side. This incorrect indication is compensated for due to the fact that the resistances 23 and 24 consist of a conductive material with positive electrical temperature coefficient. This has an effect such that the resistance of the two measuring circuits is increased and the measuring current is reduced by a certain amount. Thus the zero point of the indication and all the measuring points are moved to the left by the same amount. Instead of the curve 37 (Figure 6) the chain-line curve 37' is recorded, which corresponds to the stress course actually occurring at the measuring temperature concerned.

What we claim is:

1. A contact strain gauge for ascertaining stress distribution and the variation of force on test specimens and machine parts under static and dynamic loads, comprising a plurality of conductors, said conductors being secured by a layer of bonding material on the surface of a test specimen, each conductor having a severance effecting a pair of stress calibrated relatively movable contact points, said pairs being operable one at a time in response to progressively increasing stress wherein said contact points of each pair coact to control an indicator circuit comprising a signal means at a respective predetermined stress for effecting a sequence of signals as a test specimen is placed under progressively increasing stress.

2. A contact strain gauge as set forth in claim 1, wherein the conductors comprise a plurality of wires disposed in close parallel spacing, certain wires having their contact points spaced at predetermined gaps, and other wires having their contact points abutting with predetermined stress.

3. A contact strain gauge as set forth in claim 1, wherein the coefficient of heat expansion of the material of the conductors is equal to the coefficient of heat expansion of the material of the article to be tested.

4. A contact strain gauge to be bonded to the surface of a test speciment comprising a U shaped conductor having two parallel wires, one of said wires being severed to provide spaced engageable contact points and the other of said wires being electrically and mechanically continuous and connected to an end of said one wire to compensate for heat expansion of the separated portions of said first wire.

5. A contact strain gauge for ascertaining stress distribution and the variation of force on test specimens and machine parts under static and dynamic loads comprising a plurality of parallel spaced conductive elements and means for securing said elements in parallel spaced disposition closely adjacent the surface of a test specimen whereby said elements are stressed as stress is placed on said specimen, each of said elements being severed at a predetermined place whereby a pair of contact points are formed at the place of severance which may approach or recede from each other to make or break contact depending upon whether compressive or tensile stresses are placed on said specimen, certain of said pairs of contact points being of varying distance between points.

6. A contact strain gauge for ascertaining stress distribution and the variation of force on test specimens and machine parts under static and dynamic loads comprising a plurality of parallel spaced conductive elements and means for securing said elements in parallel disposition closely adjacent the surface of a test specimen whereby said elements are stressed as stress is placed on said specimen, each of said elements being severed at a predetermined place whereby a pair of contact points are formed at the place of severance, said contact points in each specimen being spaced apart at a predetermined distance corresponding to a degree of compressive stress to which said specimen is subjected, whereby each pair of contact points will come into engagement at predetermined times correlated with progressively increasing compressive stress on said specimen.

7. A contact strain gauge for ascertaining stress distribution and the variation of force on test specimens and machine parts under static and dynamic loads comprising a plurality of parallel spaced conductive elements and means for securing said elements in parallel spaced disposition closely adjacent the surface of a test specimen whereby said elements are stressed as stress is placed on said specimen, each of said elements being severed at a predetermined place whereby a pair of contact points are formed at the place of severance, wherein each pair of contact points are abuttedly engaged with a predetermined degree of compressive stress correlated with degrees of tensile stress to which said specimen is to be subjected so that said contact points will separate sequentially as tensile stress is progressively increased on said specimen.

8. A contact strain gauge for ascertaining stress distribution and the variation of force on test specimens and machine parts under static and dynamic loads comprising a plurality of parallel spaced conductive elements and means for securing said elements in parallel spaced disposition closely adajcent the surface of a test specimen whereby said elements are stressed as stress is placed on said specimen, each of said elements being severed at a predetermined place whereby a pair of spaced contact points are formed at the place of severance which may approach or recede from each other to make or break contact, respectively, depending upon whether compressive or tensile stresses are placed on said specimen, each conductor element comprising an elongated U-shaped wire formation having two parallel legs, the place of severance being in one of said legs, whereby expansion due to heat of the portions of the severed leg is compensated for by the expansion due to heat of the unsevered leg.

9. A contact strain gauge for ascertaining stress distribution and the variation of force on test specimens and machine parts under static and dynamic loads comprising a plurality of parallel spaced conductive elements and means for securing said elements in parallel spaced disposition closely adjacent the surface of a test specimen whereby said elements are stressed as stress is placed on said specimen, each of said elements being severed at a predetermined place whereby a pair of contact points are formed at the place of severance which points may approach or recede from each other to make or break contact depending upon whether compressive or tensile stresses are placed on said specimen, wherein each conductor element comprises an elongated loop of wire having a pair of parallel spaced legs, one of said legs having said place of severance, the other of said legs being continuous and having its ends connected to the ends of said severed leg so as to serve as a shunt resistance for said severed leg, certain of said pairs of contact points being of varying distance between points.

10. A contact strain gauge for ascertaining stress distribution and the variation of force on test specimens and machine parts under static and dynamic loads comprising a plurality of parallel spaced conductive elements and means for securing said elements in parallel spaced disposition closely adjacent the surface of a test specimen whereby said elements are stressed as stress is placed on said specimen, each of said elements being severed at a predetermined place whereby a pair of contact points are formed at the place of severance which points may approach or recede from each other to make or break contact depending upon whether compressive or tensile stresses are placed on said specimen, wherein at least one of the conductor elements comprises an elongated loop of wire having a pair of parallel spaced legs, one of said legs having said place of severance, the other of said legs being continuous and having its ends connected to the ends of said severed leg so as to serve as a shunt resistance for said severed leg, including a gap between the contact points of the wire at the place of severance in said severed leg of predetermined distance whereby elongation of the portions of said severed leg due to heat expansion tending to reduce said gap distance is compensated for by elongation of said unsevered leg by heat expansion, certain of said pairs of contact points being of varying distance between points.

References Cited in the file of this patent
UNITED STATES PATENTS

| | | |
|---|---|---|
| 1,285,145 | Harrington | Nov. 19, 1918 |
| 2,091,535 | Templin | Aug. 31, 1937 |
| 2,345,931 | Gates | Apr. 4, 1944 |
| 2,438,205 | Coates | Mar. 23, 1948 |